US012668258B2

(12) United States Patent
Lim et al.

(10) Patent No.: US 12,668,258 B2
(45) Date of Patent: Jun. 30, 2026

(54) ADAPTIVE THERMAL COOLING MECHANISM APPARATUS, SYSTEM AND METHOD FOR VEHICLE PROCESSOR

(71) Applicants: Hyundai Motor Company, Seoul (KR); Kia Corporation, Seoul (KR)

(72) Inventors: Hong Yeol Lim, Incheon (KR); Soo Ho Baek, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 1019 days.

(21) Appl. No.: 17/713,830

(22) Filed: Apr. 5, 2022

(65) Prior Publication Data

US 2023/0044762 A1 Feb. 9, 2023

(30) Foreign Application Priority Data

Aug. 4, 2021 (KR) ........................ 10-2021-0102739

(51) Int. Cl.
| | |
|---|---|
| *B60W 50/08* | (2020.01) |
| *B60W 50/00* | (2006.01) |
| *B60W 50/14* | (2020.01) |
| *G06F 1/20* | (2006.01) |
| *H04L 67/125* | (2022.01) |

(52) U.S. Cl.
CPC ...... *B60W 50/082* (2013.01); *B60W 50/0098* (2013.01); *B60W 50/14* (2013.01); *G06F 1/206* (2013.01); *H04L 67/125* (2013.01)

(58) Field of Classification Search
CPC .. B60W 30/146; B60W 40/08; B60W 40/105; B60W 50/0098; B60W 50/02; B60W 50/0205; B60W 50/029; B60W 50/038; B60W 50/082; B60W 50/14; B60W 60/0016; B60W 60/0018; B60W 60/00186; B60W 2040/0818; B60W 2050/0215; B60W 2050/0297; B60W 2400/00; B60W 2420/403; B60W 2540/229; B60W 2720/10; B60W 2720/103; G06F 1/206; G06F 1/3206; G06F 1/3243; G06F 1/329; H04L 67/12; H04L 67/125; Y02D 10/00
See application file for complete search history.

(56) References Cited

U.S. PATENT DOCUMENTS

| | | | |
|---|---|---|---|
| 5,953,536 | A | 9/1999 | Nowlin, Jr. |
| 9,145,100 | B2 | 9/2015 | Watanabe |
| 9,421,974 | B2 | 8/2016 | Kawai |

(Continued)

FOREIGN PATENT DOCUMENTS

| | | |
|---|---|---|
| JP | 2016-159766 A | 9/2016 |
| JP | 6003746 B | 9/2016 |

(Continued)

*Primary Examiner* — Peter D Nolan
*Assistant Examiner* — Ce Li Li
(74) *Attorney, Agent, or Firm* — MORGAN, LEWIS & BOCKIUS LLP

(57) ABSTRACT

A cooling mechanism apparatus, system, and method for adaptively controlling heat of a vehicle processor, includes a processor configured to control deactivation or activation of an application driving the in-vehicle controller depending on grades of a predetermined functional safety level of the application and to determine an order of the deactivation or the activation of the application when heat is generated in the controller.

18 Claims, 5 Drawing Sheets

(56)          References Cited

U.S. PATENT DOCUMENTS

| | | | |
|---|---|---|---|
| 9,494,996 B2 | 11/2016 | Varma et al. | |
| 9,855,816 B2 | 1/2018 | Meyhofer et al. | |
| 2010/0085179 A1* | 4/2010 | Shank | B60Q 11/00 |
| | | | 340/458 |
| 2010/0169562 A1* | 7/2010 | Jin | G06F 12/0638 |
| | | | 711/E12.083 |
| 2012/0209486 A1* | 8/2012 | Stander | B60W 10/18 |
| | | | 701/70 |
| 2014/0070545 A1* | 3/2014 | Engber | B60W 10/30 |
| | | | 290/40 R |
| 2016/0039414 A1 | 2/2016 | Kawai | |
| 2016/0124498 A1* | 5/2016 | Chung | H04L 12/2803 |
| | | | 345/156 |
| 2017/0174037 A1 | 6/2017 | Meyhofer et al. | |
| 2017/0282675 A1 | 10/2017 | Meyhofer et al. | |
| 2017/0355380 A1* | 12/2017 | Fendt | G08G 1/167 |
| 2019/0143915 A1* | 5/2019 | Lei | B60R 16/0232 |
| | | | 701/29.2 |
| 2020/0150699 A1* | 5/2020 | Marotta | B64D 13/06 |
| 2020/0356149 A1* | 11/2020 | Chae | G06F 1/3287 |
| 2021/0086920 A1* | 3/2021 | Jaeger | B64G 1/58 |
| 2021/0094530 A1 | 4/2021 | Sugihara | |
| 2022/0089193 A1* | 3/2022 | Dworakowski | B60W 50/029 |
| 2022/0272514 A1* | 8/2022 | Kwon | H04W 4/40 |

FOREIGN PATENT DOCUMENTS

| | | |
|---|---|---|
| JP | 2020-106918 A | 7/2020 |
| JP | 2021-054316 A | 4/2021 |
| KR | 10-2010-0013404 A | 2/2010 |
| KR | 10-2018-0055643 A | 5/2018 |
| KR | 10-2018-0087453 A | 8/2018 |

* cited by examiner

| Severity | Exposure | Controllability | | |
|---|---|---|---|---|
| | | C1 (Simple) | C2 (Nomal) | C3 (Difficult, Uncontrollable) |
| S1 LIGHT AND MODERATE INJURIES | E1(Very low) | QM | QM | QM |
| | E2(Low) | QM | QM | QM |
| | E3(Medium) | QM | QM | A |
| | E4(High) | QM | A | B |
| S2 SEVERE AND LIFE THREATENING INJURIES- SURVIVAL PROBABLE | E1(Very low) | QM | QM | QM |
| | E2(Low) | QM | QM | A |
| | E3(Medium) | QM | A | B |
| | E4(High) | A | B | C |
| S3 LIFE THREATENING INJURIES, FATAL INJURIES | E1(Very low) | QM | QM | A |
| | E2(Low) | QM | A | B |
| | E3(Medium) | A | B | C |
| | E4(High) | B | C | D |

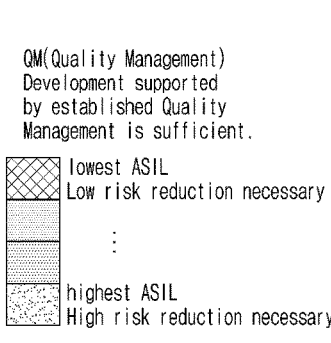

QM(Quality Management)
Development supported
by established Quality
Management is sufficient.

lowest ASIL
Low risk reduction necessary

⋮ highest ASIL
High risk reduction necessary

Fig.3

ADAPTIVE THERMAL COOLING MECHANISM APPARATUS, SYSTEM AND METHOD FOR VEHICLE PROCESSOR

CROSS-REFERENCE TO RELATED APPLICATION

The present application claims priority to Korean Patent Application No. 10-2021-0102739, filed on Aug. 4, 2021, the entire contents of which is incorporated herein for all purposes by this reference.

BACKGROUND OF THE INVENTION

Field of the Invention

The present invention relates to a cooling mechanism apparatus, system and method for adaptively controlling heat of a vehicle processor, and more particularly, to a technique for responding to heat generation of a controller during autonomous driving control of a vehicle.

Description of Related Art

Recently, as a hardware specification of a controller for autonomous driving and required performance of software are rapidly increased, the controller has a heat-generation problem.

In a chip temperature control technique of the controller, a chip manufacturer specifies a guaranteed temperature for a designed chip to operate, and when the guaranteed temperature is exceeded, heat generation is controlled by lowering an operating frequency. However, in the case where the chip temperature does not drop even when the operating frequency is lowered, a batch process is performed, such as shutting down the controller to prevent chip failure. However, in the instant case, reliability of an autonomous driving service due to abrupt transfer of control authority to a driver may be reduced, and a feeling of heterogeneity in operation may be provided.

Furthermore, in terms of software performance, as performance of a pre-scheduled overall system is reduced by lowering the operating frequency to control the heat generation, serious problems may occur, such as facilitating to guarantee real-time processing of software in the autonomous driving controller.

Accordingly, conventionally, an air cooling type (cooling fan) or an expensive water cooling type (coolant) of method is used to relieve heat of the controller, but the present hardware method has problems in increasing a manufacturing cost and component failure.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a cooling mechanism apparatus, system, and method for adaptively controlling heat of a vehicle processor, configured for providing a safe autonomous driving service without a feeling of heterogeneity by turning off autonomous driving services in stages depending on functional safety importance (automotive safety integrity level (ASIL)) when heat is generated in a controller during autonomous driving.

The technical objects of the present invention are not limited to the objects mentioned above, and other technical objects not mentioned may be clearly understood by those skilled in the art from the description of the claims.

Various aspects of the present invention are directed to providing a cooling mechanism apparatus of a vehicle including: a processor configured to control deactivation or activation of an application driving an in-vehicle controller depending on grades of a predetermined functional safety level of the application and to determine an order of the deactivation or the activation of the application when heat is generated in the controller.

In various exemplary embodiments of the present invention, the processor may determine that the heat is generated when a temperature of the in-vehicle controller exceeds a predetermined reference value for a predetermined time period.

In various exemplary embodiments of the present invention, the processor may determine whether to perform deactivation of an application having a lowest grade of the functional safety level among one or more applications driving the controller in which the heat is generated.

In various exemplary embodiments of the present invention, the processor, when the deactivation of the application having the lowest grade of the functional safety level is enabled to be performed, may enter the application having the lowest grade of the functional safety level into an idle mode.

In various exemplary embodiments of the present invention, the processor may transition a state of the application from the idle mode to a thermal fail-safe mode, and may deactivate the application having the lowest grade of the functional safety level.

In various exemplary embodiments of the present invention, the processor may provide a user with a notification of deactivation or activation of a service provided by the application when the deactivation or the activation of the application is performed.

In various exemplary embodiments of the present invention, it may further include an interface device configured to output the notification, and the processor may control the interface device to output a pop-up to the user at all times or the notification when a driver manipulates the interface device.

In various exemplary embodiments of the present invention, the processor may monitor a temperature of the controller configured for a predetermined time period after deactivating a service provided by the application having the lowest grade of the functional safety level.

In various exemplary embodiments of the present invention, the processor may activate the deactivated application when the temperature of the controller is equal to or smaller than a first reference value, which is a reference for deactivating the application.

In various exemplary embodiments of the present invention, the processor, when a plurality of applications has been deactivated, may sequentially activate the applications depending on the grades of the functional safety level.

In various exemplary embodiments of the present invention, the processor, when the temperature of the controller is lowered to between the first reference value and a second reference value which is greater than the first reference value, may sequentially activate deactivated applications depending on the grades of the functional safety level, or activates a predetermined number of the deactivated applications.

In various exemplary embodiments of the present invention, the processor, when the deactivation of the application having the lowest grade of the functional safety level is unable to be performed, may determine whether deactivation of an application having a next highest grade of the functional safety level is enabled to be performed.

In various exemplary embodiments of the present invention, the processor may enter a state of the application having the next highest grade of the functional safety level to an idle mode, and may transition it from the idle mode to a thermal fail-safe mode when the deactivation of the application having the next highest grade of the functional safety level is enabled to be performed.

In various exemplary embodiments of the present invention, the processor may shut down the controller when it is impossible to deactivate the application depending on the grades of the functional safety level.

In various exemplary embodiments of the present invention, the processor when a plurality of applications is deactivated, may deactivate the applications in an order of increasing the grade of the functional safety level from an application having a lower grade thereof.

In various exemplary embodiments of the present invention, the processor, when a plurality of applications is deactivated, may determine temperature monitoring times of the deactivated applications depending on the grades of the functional safety level.

In various exemplary embodiments of the present invention, the processor may not perform the deactivation of the application having the highest grade of the functional safety level.

Various aspects of the present invention are directed to providing a vehicle cooling system including: a temperature sensor configured to detect heat generated by an in-vehicle controller; and a vehicle cooling mechanism apparatus configured to control deactivation or activation of an application driving the in-vehicle controller depending on grades of a predetermined functional safety level of the application when the generated heat is detected by the temperature sensor.

Various aspects of the present invention are directed to providing a vehicle cooling method, including: determining whether heat is generated in an in-vehicle controller; and controlling deactivation or activation of an application driving the controller depending on grades of a predetermined functional safety level of the application when the heat is generated.

In various exemplary embodiments of the present invention, the controlling of the deactivation or the activation of the application may include: determining whether to perform deactivation of an application having a lowest grade of the functional safety level among one or more applications driving the controller in which the heat is generated. performing the deactivation of the application having the lowest grade of the functional safety level when the deactivation of the application having the lowest grade of the functional safety level is enabled to be performed; determining whether deactivation of an application having a next highest grade of the functional safety level is enabled to be performed when the deactivation of the application having the lowest grade of the functional safety level is unable to be performed; and performing the deactivation of the application having the next highest grade of the functional safety level when the deactivation of the application having the next highest grade of the functional safety level is enabled to be performed.

According to the present technique, it is possible to provide a safe autonomous driving service without a feeling of heterogeneity by turning off autonomous driving services in stages depending on functional safety importance (automotive safety integrity level (ASIL)) when heat is generated in a controller during autonomous driving.

Furthermore, various effects which may be directly or indirectly identified through the present specification may be provided.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 illustrates schematic diagram showing an automotive safety integrity level (ASIL) according to various exemplary embodiments of the present invention.

Figure 1:
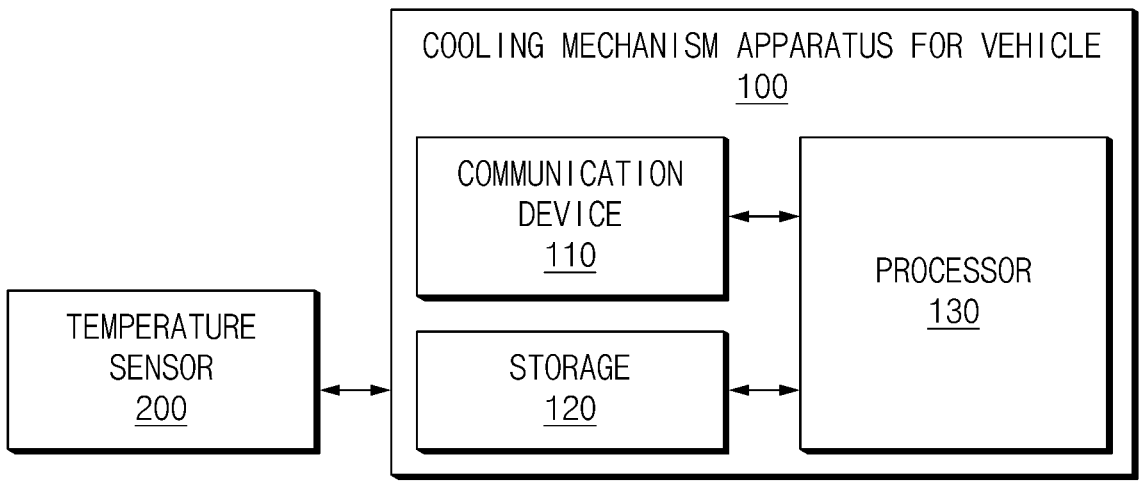
FIG. 1 illustrates a block diagram showing a configuration of a vehicle cooling system according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, some exemplary embodiments of the present invention will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present invention, when it is determined that detailed descriptions of related well-known configurations or functions interfere with understanding of the exemplary embodiments of the present invention, the detailed descriptions thereof will be omitted.

In describing constituent elements according to various exemplary embodiments of the present invention, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which various exemplary embodiments of the present invention pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present invention will be described in detail with reference to FIG. 1 to FIG. 5.

FIG. 1 illustrates a block diagram showing a configuration of a vehicle cooling system according to various exemplary embodiments of the present invention.

Referring to FIG. 1, the vehicle cooling system according to the exemplary embodiment of the present invention may include a vehicle cooling mechanism apparatus 100 and a temperature sensor 200.

The vehicle cooling mechanism apparatus 100 according to the exemplary embodiment of the present invention may be implemented inside a vehicle. In the instant case, the vehicle cooling mechanism apparatus 100 may be integrally formed with internal control units of the vehicle, or may be implemented as a separate device to be connected to control units of the vehicle by a separate connection means.

The vehicle cooling mechanism apparatus 100 may monitor heat of an autonomous driving-related controller in the vehicle, and may control deactivation or activation of one or more applications that drive the controller depending on whether the heat of the autonomous driving-related controller is generated.

Referring to FIG. 1, the vehicle cooling mechanism apparatus 100 may include a communication device 110, a storage 120, an interface device 140, and a processor 130.

The communication device 110 is a hardware device implemented with various electronic circuits to transmit and receive signals through a wireless or wired connection, and may transmit and receive information based on in-vehicle devices and in-vehicle network communication techniques. As various exemplary embodiments of the present invention, the in-vehicle network communication techniques may include controller area network (CAN) communication, local interconnect network (LIN) communication, flex-ray communication, Ethernet communication, and the like.

The storage 120 may store data and/or algorithms required for the processor 130 to operate, and the like. As various exemplary embodiments of the present invention, the non-transitory storage 120 may store controller information for each automotive safety integrity level (ASIL) based on functional safety importance, and a heating reference value for each controller.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 140 may include an input means for receiving a control command from a user and an output means for outputting an operation state of the apparatus 100 and results thereof. Herein, the input means may include a key button, and may include a mouse, a joystick, a jog shuttle, a stylus pen, and the like. Furthermore, the input means may include a soft key implemented on the display. The output device may include a display, and may also include a voice output means such as a speaker. In the instant case, when a touch sensor formed of a touch film, a touch sheet, or a touch pad is provided on the display, the display may operate as a touch screen, and may be implemented in a form in which an input device and an output device are integrated. In various exemplary embodiments of the present invention, the output means may output a notification to a driver when an autonomous driving service is turned off. In the instant case, the output means may perform a notification in a form of a pop-up at all times or when the driver manipulates it. Furthermore, the output means may perform notification by outputting a phrase, a voice, a warning sound, tactile sense, etc. When notifying that the autonomous driving service is turned off. Although the present invention includes a configuration for perform a notification through the interface device 140, a configuration for outputting a separate notification may be provided.

In the instant case, the display may include at least one of a liquid crystal display (LCD), a thin film transistor liquid crystal display (TFT LCD), an organic light emitting diode display (OLED display), a flexible display, a field emission display (FED), or a 3D display.

The processor 130 may be electrically connected to the communication device 110, the storage 120, the interface device 140, and the like, may electrically control each component, and may be an electrical circuit that executes software commands, performing various data processing and calculations described below.

The processor 130 may process a signal transferred between components of the vehicle cooling mechanism apparatus 100, and may perform overall control such that each of the components can perform its function normally.

The processor 130 may be implemented in a form of hardware, software, or a combination of hardware and software, or may be implemented as microprocessor, and may be, e.g., an electronic control unit (ECU), a micro controller unit (MCU), or other subcontrollers mounted in the vehicle.

The processor 130 may control deactivation or activation of an application that drives the in-vehicle controller when heat is generated by the controller depending on a predetermined functional safety level (ASIL) of the application. In the instant case, the ASIL is a safety integrity certification level, which indicates a functional safety risk level for a vehicle. A standard ASIL divides a safety risk level into multiple levels based on severity, exposure, and controllability, and the levels include quality management (QM), A, B, C, and D levels, and Level D indicates a highest safety risk level. For example, the ASIL QM may include predetermined beam assist (HBA), the ASIL D may include forward collision avoidance assist (FCA), the ASIL C may include blind-spot collision avoidance assist (BCA), the ASIL B may include lane keeping assist (LKA), and the ASIL A may include lane keeping warning (LDW), but the present invention is not limited thereto, and the functional safety level for each vehicle control function may be changed depending on situations.

The processor 130 may sequentially deactivate some applications depending on the functional safety level, and may sequentially deactivate the applications from a low functional safety level to a high level. That is, deactivation is performed in the order of QM, A, B, and C, but for safety of the vehicle, the deactivation of an application whose functional safety level is D is not performed.

The processor 130 may determine that heat is generated when a temperature of the in-vehicle controller exceeds a predetermined reference value for a predetermined time period. In the instant case, the predetermined time period and the predetermined reference value may be preset by an experiment value, and the predetermined reference value may be determined by the chip manufacturer.

The processor 130 may determine whether deactivation of an application having a lowest functional safety level among one or more applications driving a controller in which heat is generated may be performed.

When the deactivation of the application having the lowest functional safety level may be performed, the processor 130 may enter the application having the lowest functional safety level into an idle mode.

The processor 130 may transition a state of the application from the idle mode to a thermal fail-safe mode, and may deactivate the application having the lowest functional safety level.

The processor 130 may notify a user of deactivation or activation of a service provided by the application upon deactivation or activation of the application.

The processor 130 may control the interface device 140 to output a pop-up to the user at all times or a notification when a driver manipulates the interface device.

The processor 130 may monitor the temperature of the controller configured for a predetermined time period after inactivating the service provided by the application having the lowest functional safety level.

The processor 130 may activate the deactivated application when the temperature of the controller is smaller than or equal to a first reference value, which is a reference for deactivating the application. In the instant case, the first reference value may be determined in advance by an experimental value or may be provided by a chip manufacturer.

When there is a plurality of applications that have been deactivated, the processor 130 may sequentially activate them depending on the functional safety level.

When the temperature of the controller is lowered to between the first reference value and a second reference value which is greater than the first reference value, the processor 130 may sequentially activate the deactivated applications depending on the functional safety level, and may activate some of the deactivated applications. In the instant case, the second reference value may be determined in advance by experimental values.

When the deactivation of the application having the lowest functional safety level is unable to be performed, the processor 130 may determine whether deactivation of an application having a next highest functional safety level may be performed.

The processor 130 may enter a state of the application having the next highest functional safety level to the idle mode, and may transition it from the idle mode to the thermal fail-safe mode when the deactivation of the application having the next highest functional safety level may be performed.

The processor 130 may shut down the controller when it is impossible to deactivate the application depending on the functional safety level.

When applications are deactivated, the processor 130 may deactivate the applications in an order of increasing the functional safety level from a low-level application.

When the applications are deactivated, the processor 130 may determine temperature monitoring times of the deactivated applications depending on the functional safety level.

The temperature sensor 200 may detect a temperature of each controller of the vehicle to transmit it to the vehicle cooling mechanism apparatus 100. Each of the controllers of the vehicle may include smart cruise control (SCC), highway driving assist (HDA), driver attention warning (DAW), lane keeping assist (LKA), lane departure warning (LKA), high beam assist (HBA), blind-spot collision warning (BCW), blind-spot collision avoidance-assist, forward collision avoidance assist (FCA), and the like.

Figure 2:
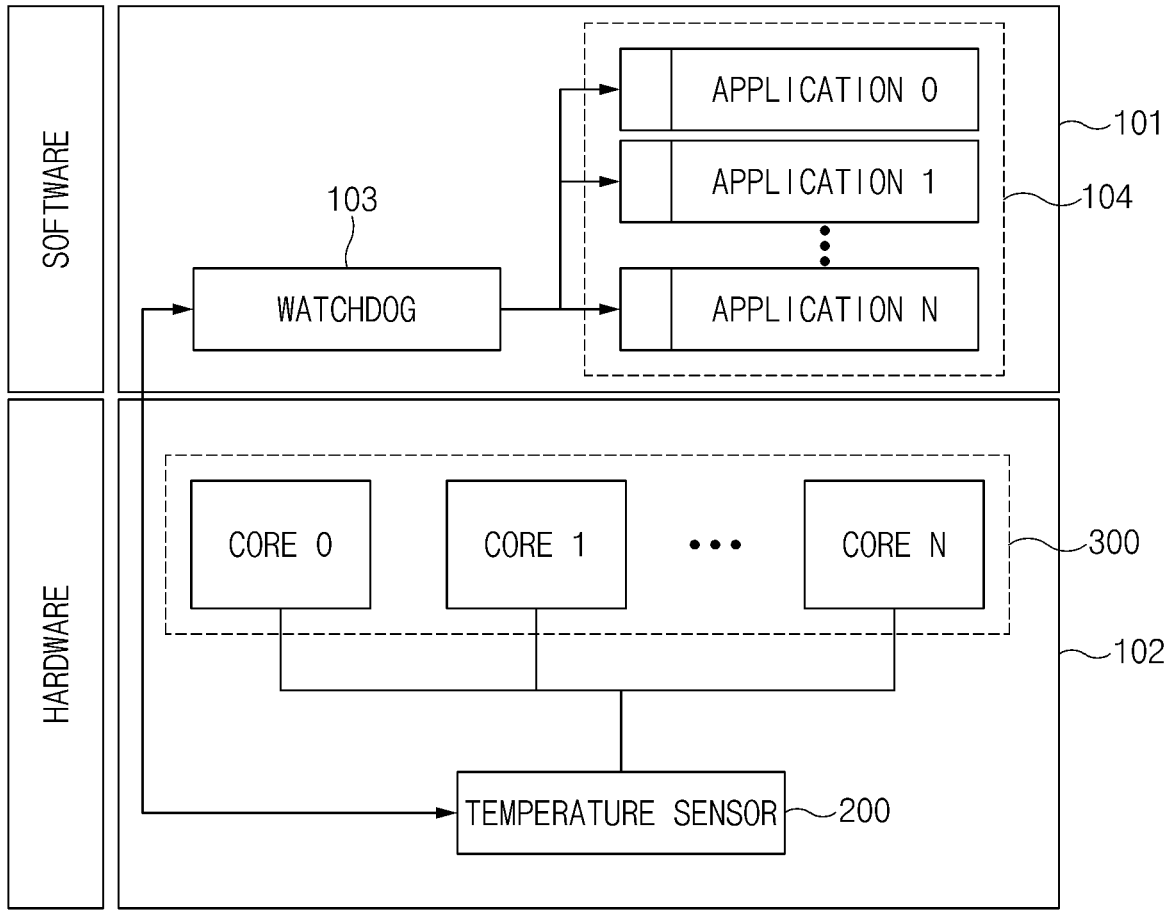
FIG. 2 illustrates an architecture of a vehicle cooling system according to various exemplary embodiments of the present invention.

FIG. 2 illustrates an architecture of a vehicle cooling system according to various exemplary embodiments of the present invention.

Referring to FIG. 2, the vehicle cooling system according to various exemplary embodiments of the present invention includes a software layer 101 and a hardware layer 102.

The software layer 101 may include a watchdog 103 and at least one application 104.

The watchdog 103 may read a temperature for each controller from the temperature sensor 200.

The watchdog 103 may use the temperature for each controller received from the temperature sensor 200 to detect the presence of a controller whose temperature exceeds a reference value, to determine the ASIL of vehicle controllers (cores), to determine whether there is a controller which may be turned off, to turn off the controller which may be turned off depending on the ASIL, and to control shutdown of the vehicle system if necessary.

At least one application 104 includes software for driving each controller.

The hardware layer 102 may include a temperature sensor 200 that detects the temperature of each controller internal chip, and one or more cores 300.

The one or more cores 300 may be, e.g., an electronic control unit (ECU), a micro controller unit (MCU), a central processing unit (CPU), or other subcontrollers mounted in the vehicle.

The temperature sensor 200 may detect the temperature of the controllers of the one or more cores 300 at a predetermined time interval.

Accordingly, according to various exemplary embodiments of the present invention, it is possible to stably provide an autonomous driving service by controlling a chip temperature generated inside a controller at a software level as hardware and software specifications of the controller configured for autonomous driving have recently become high-performance.

That is, according to various exemplary embodiments of the present invention, it is possible to provide a driver with a safe autonomous driving service for as long as possible and provides an autonomous driving service without a feeling of heterogeneity, by partially driving autonomous driving service with a mechanism that turns off the autonomous driving service in a stepwise way according to an ASIL of a controller (functional safety importance) and turns the service on again depending on a heat control result thereof when heat generated in the controller exceeds a guaranteed temperature of the manufacturer.

FIG. 3 illustrates schematic diagram showing an automotive safety integrity level (ASIL) according to various exemplary embodiments of the present invention.

Referring to FIG. 3, applications that drive a controller may be defined by being divided into ASILs as illustrated in FIG. 3, the ASILs may be determined based on severity, exposure, and controllability, and a functional safety mechanism with high robustness are required in a following order: ASIL QM, ASIL A, ASIL B, ASIL C, and ASIL D.

Furthermore, an example of an autonomous driving function that complies with ASIL D may include functions that are important for driver and pedestrian safety, such as forward collision avoidance assist (FCA), and a more robust operation may be requested in non-operation time and handling when an error occurs.

Figure 4:
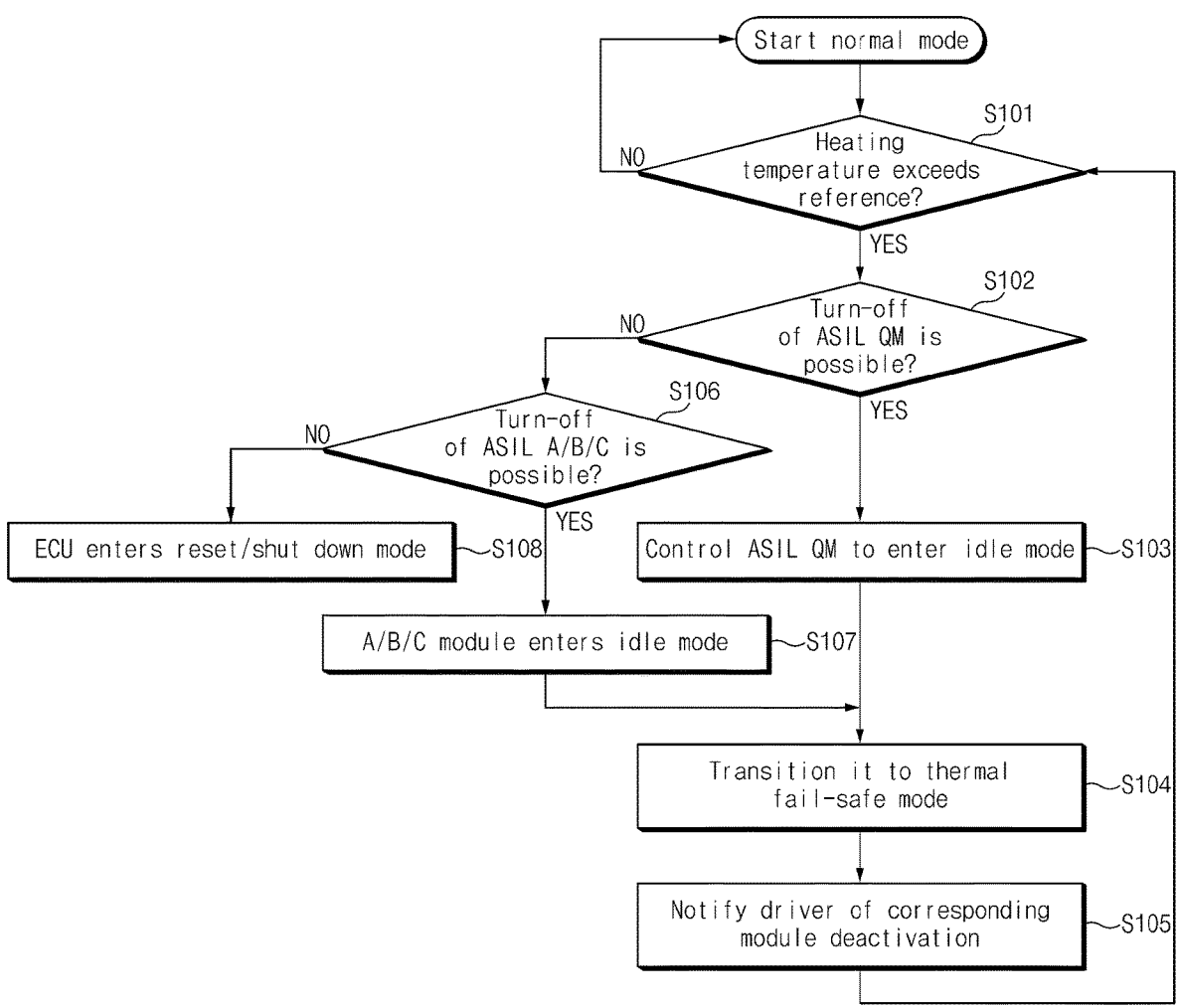
FIG. 4 illustrates a flowchart showing a method for cooling a vehicle controller according to various exemplary embodiments of the present invention.

Hereinafter, a vehicle cooling method according to various exemplary embodiments of the present invention will be described in detail with reference to FIG. 4. FIG. 4 illustrates a flowchart showing a vehicle cooling method according to various exemplary embodiments of the present invention.

Hereinafter, it is assumed that the vehicle cooling mechanism apparatus 100 of FIG. 1 performs processes of FIG. 4. Furthermore, in the description of FIG. 4, operations referred to as being performed by a device may be understood as being controlled by the processor 130 of the LiDAR for each vehicle cooling mechanism apparatus 100.

Referring to FIG. 4, in the vehicle cooling mechanism apparatus 100, controllers are driven in a normal mode during autonomous driving. Accordingly, the vehicle cooling mechanism apparatus 100 monitors a temperature of one or more controllers in a vehicle at a predetermined time interval to determine whether a heating temperature of the one or more controllers in the vehicle exceeds a predetermined reference value (S101).

When the heating temperature of the one or more controllers in the vehicle exceeds the predetermined reference value, the vehicle cooling mechanism apparatus 100 may determine whether turn-off of ASIL QM is possible among applications of the controller in which the heating temperature exceeds the predetermined reference value, based on a functional safety level (ASIL) table of FIG. 3 (S102). That is, the vehicle cooling mechanism apparatus 100 may determine that the turn-off of the ASIL QM is possible when ASIL QM exists among applications of the controller in which the heating temperature exceeds a predetermined reference value. In the instant case, the ASIL of the application, which is the software that drives the controller, may have grades of QM, A, B, C, and D, the applications that drive the controller may be turned off in the order of QM, A, B, and C as the ASIL, and it may be possible to determine whether there is a controller configured for turn-off (deactivation) of the application. In the instant case, the D, which is a grade with a highest functional safety response, may be excluded from the application targets to be turned off to provide a minimum autonomous driving service.

When it is possible to turn off an application of ASIL QM, the vehicle cooling mechanism apparatus 100 controls the application of ASIL QM to enter an idle mode (S103).

Accordingly, the vehicle cooling mechanism apparatus 100 transitions an application mode from an idle mode to a thermal fail-safe mode (S104), deactivates (off) a corresponding application, and notifies a driver of a service depending on the deactivated application (S105). In the instant case, the vehicle cooling mechanism apparatus 100 may notify the driver of the deactivation of the service in a form of a pop-up at all times or when the driver manipulates it. Thereafter, the vehicle cooling mechanism apparatus 100 monitors a temperature of a controller of the turned-off application for a predetermined time period, and when the temperature falls below a predetermined reference value, activates the turned-off application and enters a normal mode. In the instant case, the predetermined time period for temperature monitoring of the controller may be set differently depending on the ASIL and safety and convenience-related functions. For example, the predetermined time period may be 300 ms.

On the other hand, the vehicle cooling mechanism apparatus 100 may attempt to perform off of the A, B, and C which are higher than the QM by performing steps S102 to S108 when the temperature of the controller of the turned-off application still exceeds the predetermined reference value.

Meanwhile, when it is impossible to turn off the application of ASIL QM in step S102, it may be possible to determine whether the applications of the remaining A, B, and C of the ASIL may be turned off (S106).

When it is possible to turn off the ASIL A, B, and C applications, a state of the corresponding application is entered into the idle mode in the order of A, B, and C (S107). Accordingly, the vehicle cooling mechanism apparatus 100 transitions an application from an idle mode to a thermal fail-Safe mode (S104), deactivates (off) a corresponding application, and notifies a driver of a service depending on the deactivated application (S105). In the instant case, the vehicle cooling mechanism apparatus 100 may notify the driver of the deactivation of the service in a form of a pop-up at all times or when the driver manipulates it.

Thereafter, the vehicle cooling mechanism apparatus 100 monitors a temperature of a controller of the turned-off application for a predetermined time period, and when the temperature falls below a predetermined reference value, activates the turned-off application and enters a normal mode. In the instant case, when a plurality of applications need to be activated, they may be activated in a predetermined order. For example, when applications are deactivated depending on the ASIL, i.e., in the order of A, B, and C, the vehicle cooling mechanism apparatus 100 may sequentially activate the applications one by one in the order of ASIL C, B, and A.

Furthermore, when a temperature of the controller is greater than or equal to a predetermined reference value or decreased within a certain level, the deactivated application may be activated in a stepwise way. For example, when the temperature is reduced to 10% relative to an operating temperature, some (e.g., ½) of the deactivated applications may be activated, and when the temperature is reduced to an additional level of 10%, some or the rest of the applications may be activated. In the instant case, a proportion or number of activated applications may be set differently depending on the autonomous driving system. For example, when 5 applications are deactivated, one application may be activated every time the temperature drops by 10%, and priority of the activated application may be determined depending on the ASIL. In the case where the priority is determined during deactivation or activation, when there are multiple applications with a same ASIL, an order thereof may be determined based on the priority received in advance from a driver.

Furthermore, in the case where the temperature of the controller is restored to the normal range below a predetermined reference value, when a deactivated service is activated, applications dependent on the service may be activated together.

The predetermined time period for temperature monitoring of the controller may be set differently depending on the ASIL and safety and convenience-related functions. For example, the predetermined time period may be 300 ms.

On the other hand, when it is impossible to turn off the ASIL A, B, or C application, the vehicle cooling mechanism apparatus 100 resets a corresponding controller (e.g., an ECU) or shuts down the vehicle system (S108).

Accordingly, according to various exemplary embodiments of the present invention, it is possible to provide a safe autonomous driving service by monitoring a chip temperature of a vehicle controller configured for providing the autonomous driving service and sequentially deactivating or activating some of a plurality of applications that drive the controller depending on a predetermined ASIL.

Figure 5:
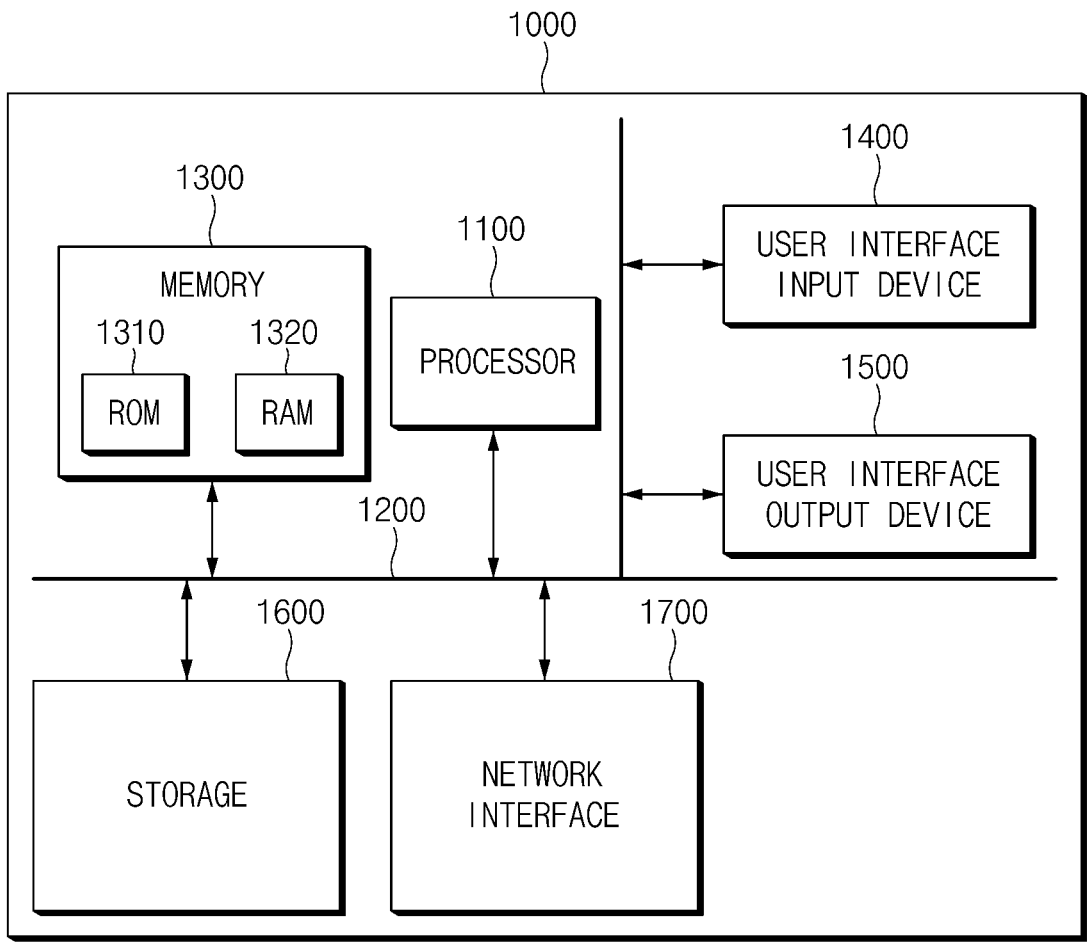
FIG. 5 illustrates a computing system according to various exemplary embodiments of the present invention.

FIG. 5 illustrates a determining system according to various exemplary embodiments of the present invention.

Referring to FIG. 5, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments included herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present invention, and those skilled in the art to which various exemplary embodiments of the present invention pertains may make various modifications and variations without departing from the essential characteristics of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A cooling mechanism apparatus for a vehicle, the cooling mechanism apparatus comprising:
   a processor configured to control deactivation or activation of an application driving an in-vehicle controller depending on grades of a predetermined functional safety level of the application and to determine an order of the deactivation or the activation of the application when heat is generated in the in-vehicle controller, and when multiple applications with a same functional safety level are existed, determine an order of the multiple applications based on priority received in advance from a driver,
   wherein the processor is configured to monitor a temperature of the in-vehicle controller for a predetermined time period after deactivating a service provided by the application having a lowest grade of the predetermined functional safety level, and to activate the deactivated application when the temperature of the in-vehicle controller is equal to or smaller than a first reference value, which is a reference for deactivating the application; and
   a storage electrically connected to the processor and configured to store information for each of the grades of the predetermined functional safety level,
   wherein the in-vehicle controller is related to the multiple applications for autonomous driving and each of the multiple applications has own grade of the predetermined functional safety level,
   wherein the grades of the predetermined functional safety level include at least a first grade indicating quality management and a second grade indicating collision avoidance assist, and
   wherein, when the temperature of the in-vehicle controller exceeds a predetermined reference value for a predetermined time period, the processor is further configured to:
   determine whether an application of the first grade exists in the multiple applications, and
   responding to determination that the application of the first grade exists, deactivate the application of the first grade, or
   responding to determination that the application of the first grade does not exist, deactivate the application of the second grade.

2. The cooling mechanism apparatus of claim 1, wherein the processor is configured to determine that the heat is generated when the temperature of the in-vehicle controller exceeds the predetermined reference value for the predetermined time period.

3. The cooling mechanism apparatus of claim 1, wherein the processor is configured to determine whether to perform deactivation of an application having the lowest grade of the predetermined functional safety level among one or more applications driving the in-vehicle controller in which the heat is generated.

4. The cooling mechanism apparatus of claim 3, wherein when the deactivation of the application having the lowest grade of the predetermined functional safety level is enabled to be performed, the processor is configured to enter the application having the lowest grade of the predetermined functional safety level into an idle mode.

5. The cooling mechanism apparatus of claim 4, wherein the processor is configured to transition a state of the application from the idle mode to a thermal fail-safe mode, and to deactivate the application having the lowest grade of the predetermined functional safety level.

6. The cooling mechanism apparatus of claim 3, wherein when the deactivation of the application having the lowest grade of the predetermined functional safety level is unable to be performed, the processor is configured to determine whether deactivation of an application having a next highest grade of the predetermined functional safety level is enabled to be performed.

7. The cooling mechanism apparatus of claim 6, wherein the processor is configured to enter a state of the application having the next highest grade of the predetermined functional safety level to an idle mode, and to transition the state of the application from the idle mode to a thermal fail-safe mode when the deactivation of the application having the next highest grade of the predetermined functional safety level is enabled to be performed.

8. The cooling mechanism apparatus of claim 7, wherein the processor is configured to shut down the in-vehicle controller when it is impossible to deactivate the application depending on the grades of the predetermined functional safety level.

9. The cooling mechanism apparatus of claim 1, wherein the processor is configured to provide a user with a notification of deactivation or activation of a service provided by the application when the deactivation or the activation of the application is performed.

10. The cooling mechanism apparatus of claim 9, further including:

an interface device configured to output the notification, wherein the processor is configured to control the interface device to output a pop-up to the user at all times or the notification when a driver manipulates the interface device.

11. The cooling mechanism apparatus of claim 1, wherein when a plurality of applications has been deactivated, the processor is configured to sequentially activate the applications depending on the grades of the predetermined functional safety level.

12. The cooling mechanism apparatus of claim 1, wherein when the temperature of the in-vehicle controller is lowered to between the first reference value and a second reference value which is greater than the first reference value, the processor is configured to sequentially activate deactivated applications depending on the grades of the predetermined functional safety level, or to activate a predetermined number of the deactivated applications.

13. The cooling mechanism apparatus of claim 1, wherein when a plurality of applications is deactivated, the processor is configured to deactivate the applications in an order of increasing the grade of the predetermined functional safety level from an application having a lower grade thereof.

14. The cooling mechanism apparatus of claim 1, wherein when a plurality of applications is deactivated, the processor is configured to determine temperature monitoring times of the deactivated applications depending on the grades of the predetermined functional safety level.

15. The cooling mechanism apparatus of claim 1, wherein the processor is configured not to perform the deactivation of the application having a highest grade of the predetermined functional safety level.

16. A cooling system for a vehicle, the cooling system comprising:

a temperature sensor configured to detect heat generated by an in-vehicle controller; and a vehicle cooling mechanism apparatus configured to control deactivation or activation of an application driving the in-vehicle controller depending on grades of a predetermined functional safety level of the application when the generated heat is detected by the temperature sensor, and when multiple applications with a same functional safety level are existed, determine an order of the multiple applications based on priority received in advance from a driver, wherein the vehicle cooling mechanism apparatus is configured to monitor a temperature of the in-vehicle controller for a predetermined time period after deactivating a service provided by the application having a lowest grade of the predetermined functional safety level, and to activate the deactivated application when the temperature of the in-vehicle controller is equal to or smaller than a first reference value, which is a reference for deactivating the application, wherein the in-vehicle controller is related to multiple applications for autonomous driving and each of the multiple applications has its own grade of the predetermined functional safety level, wherein the grades of the predetermined functional safety level include at least a first grade indicating quality management and a second grade indicating collision avoidance assist, and wherein, when the temperature of the in-vehicle controller exceeds a predetermined reference value for a predetermined time period, the vehicle cooling mechanism apparatus is further configured to:

determine whether an application of the first grade exists in the multiple applications, and responding to determination that the application of the first grade exists, deactivate the application of the first grade, or responding to determination that the application of the first grade does not exist, deactivate the application of the second grade.

17. A cooling method for a vehicle, the cooling method comprising:

determining whether heat is generated in an in-vehicle controller; and controlling deactivation or activation of an application driving the in-vehicle controller depending on grades of a predetermined functional safety level of the application when the heat is generated;

when multiple applications with a same functional safety level are existed, determining an order of the multiple applications based on priority received in advance from a driver; and monitoring a temperature of the in-vehicle controller for a predetermined time period after deactivating a service provided by the application having a lowest grade of the predetermined functional safety level, and activating the deactivated application when the temperature of the in-vehicle controller is equal to or smaller than a first reference value, which is a reference for deactivating the application, wherein the in-vehicle controller is related to multiple applications for autonomous driving and each of the multiple applications has its own grade of the predetermined functional safety level, wherein the grades of the predetermined functional safety level include at least a first grade indicating quality management and a second grade indicating collision avoidance assist, and wherein the cooling method further comprises:

when the temperature of the in-vehicle controller exceeds a predetermined reference value for a predetermined time period, determining whether an application of the first grade exists in the multiple applications, and responding to determination that the application of the first grade exists, deactivating the application of the first grade, or responding to determination that the application of the first grade does not exist, deactivating the application of the second grade.

18. The cooling method of claim 17, wherein the controlling of the deactivation or the activation of the application includes:

determining whether to perform deactivation of an application having the lowest grade of the predetermined functional safety level among one or more applications driving the in-vehicle controller in which the heat is generated;

performing the deactivation of the application having the lowest grade of the predetermined functional safety level when the deactivation of the application having the lowest grade of the predetermined functional safety level is enabled to be performed;

determining whether deactivation of an application having a next highest grade of the predetermined functional safety level is enabled to be performed when the deactivation of the application having the lowest grade of the predetermined functional safety level is unable to be performed; and performing the deactivation of the application having the next highest grade of the predetermined functional safety level when the deactivation of the application having the next highest grade of the predetermined functional safety level is enabled to be performed.

* * * * *